Figure 1:
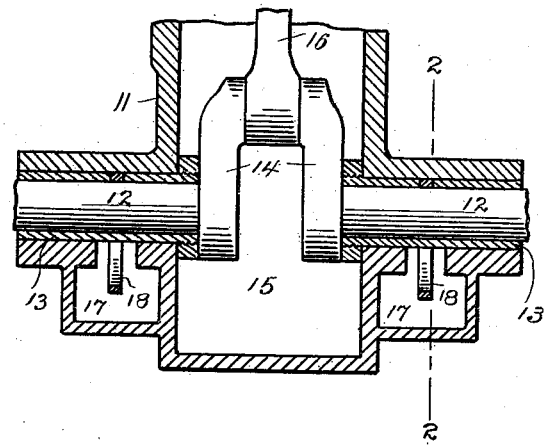

No. 712,895. Patented Nov. 4, 1902.
C. L. BARKER.
BEARING SUPPORT FOR ENGINES.
(Application filed Dec. 19, 1901.)
(No Model.)

WITNESSES.
H. A. Lamb
S. W. Atherton

INVENTOR.
Charles L. Barker
By A. M. Wooster,
Atty.

UNITED STATES PATENT OFFICE.

CHARLES L. BARKER, OF NORWALK, CONNECTICUT.

BEARING-SUPPORT FOR ENGINES.

SPECIFICATION forming part of Letters Patent No. 712,895, dated November 4, 1902.

Application filed December 19, 1901. Serial No. 86,539. (No model.)

*To all whom it may concern:*

Be it known that I, CHARLES L. BARKER, a citizen of the United States, residing at Norwalk, county of Fairfield, State of Connecticut, have invented a new and useful Bearing-Support for Engines, of which the following is a specification.

My invention relates to the construction of engines of various types—for example, gasolene explosive-engines—and has for its object to provide a base or bearing-support so constructed as to insure under all circumstances and conditions perfect oiling of the shaft, the connecting-rod, and, if desired, of the piston itself without the use of oil-cups or any outside oiling devices whatever, thereby doing away with one of the most serious objections to engines of the character used in launches, motor-carriages, &c., that engine-builders and their users now have to contend with. In order to secure the desired result, I have devised the novel engine-base or bearing-support, which I will now describe, referring to the accompanying drawings, forming part of this specification, and using reference characters to designate the several parts.

Figure 2:
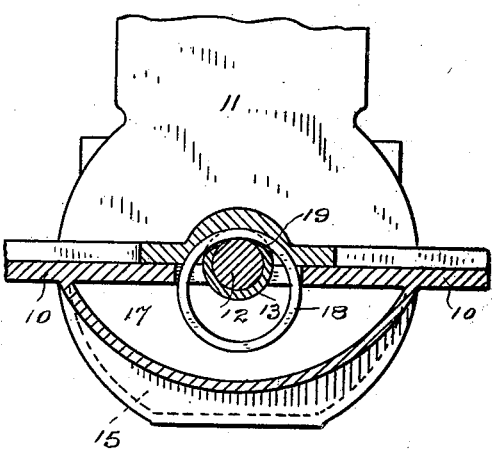
Figure 3:
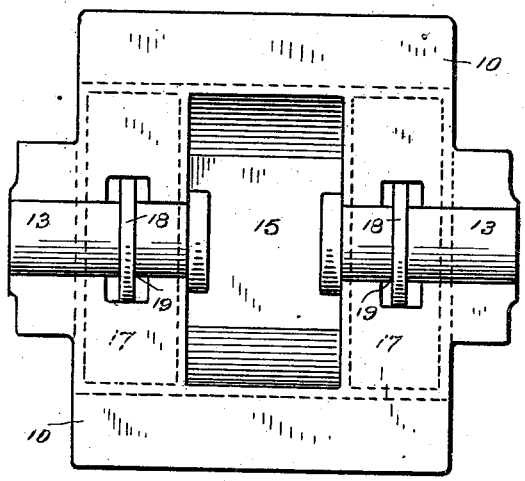

Figure 1 is a vertical section of the crank-chamber of an engine embodying my novel improvement; Fig. 2, a section on the line 2 2 in Fig. 1; and Fig. 3 is a plan view of the base with the body and shaft removed.

10 denotes the base as a whole; 11, the body; 12, the shaft; 13, bearing-sleeves therefor; 14, the crank; 15, the crank-chamber, and 16 the connecting-rod. These parts may all be of any ordinary or preferred construction.

The essential feature of my invention is that I provide the base or the bearing-support, however constructed, with one or more reservoirs 17 for oil or other lubricant separate from but contiguous to the crank-chamber and feed the oil from said reservoirs to the crank-shaft by means of rings or wicks, if preferred. As I preferably use metallic rings 18 for this purpose, I have illustrated rings only in the drawings. The special shape of these oil-reservoirs is of course of no importance so far as the principle of my invention is concerned. The rings are hung upon the shafts, as clearly shown, and depend into the reservoirs, suitable means (not shown in the drawings) being provided for filling the reservoirs. It should be understood, furthermore, that the use or omission of bearing-sleeves, as shown in the drawings, is not of the essence of my invention. Where bearing-sleeves are used, they are cut away at the top, as at 19, to receive the rings, so that the tops of the rings will lie in contact with the shaft and be free to be rotated by the shaft. In use oil is taken up by the rings and after lubricating the shaft passes freely into the crank-chamber, lubricating both ends of the connecting-rod, and in engines of the explosive type lubricating the piston (not shown) as well without any outside oil-cups or lubricators whatever. I have built engines upon this plan and having tried them for the entire season, in several instances by many hours of continuous use, have found that my novel construction meets the requirements perfectly and accomplishes results without the slightest attention to the matter of oiling that have heretofore been impossible with the greatest care and closest attention.

Having thus described my invention, I claim—

The combination with the crank-shaft of an engine, of a base or bearing-support having a shaft-bearing and a crank-chamber and an oil-reservoir separate from but contiguous to the crank-chamber and below the shaft-bearing, the walls of said reservoir being in one piece with the walls of the crank-chamber, and a ring loosely hung upon the shaft and depending in the oil-reservoir.

In testimony whereof I affix my signature in presence of two witnesses.

CHARLES L. BARKER.

Witnesses:
LEWIS C. GREEN,
NEIL H. PEIRCE.